United States Patent
Dunmore et al.

(10) Patent No.: US 7,302,444 B1
(45) Date of Patent: Nov. 27, 2007

(54) SYSTEM FOR DESIGNATING GRID-BASED DATABASE REPORTS

(75) Inventors: Ian M. Dunmore, Redmond, WA (US); Scott W. Bishel, Parker, CO (US); Eric Friedrichsen, Redmond, WA (US); George R. Shaver, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 10/641,950

(22) Filed: Aug. 15, 2003

(51) Int. Cl.
*G06F 17/00* (2006.01)
*G06F 17/30* (2006.01)

(52) U.S. Cl. .......................................... 707/102; 707/1

(58) Field of Classification Search ............. 707/1–10, 707/100–104, 200–205; 717/1–200
See application file for complete search history.

(56) References Cited

U.S. PATENT DOCUMENTS

| | | | | |
|---|---|---|---|---|
| 5,603,025 A | * | 2/1997 | Tabb et al. | 707/2 |
| 7,096,465 B1 | * | 8/2006 | Dardinski et al. | 717/178 |
| 2002/0091681 A1 | * | 7/2002 | Cras et al. | 707/3 |
| 2004/0117731 A1 | * | 6/2004 | Blyashov | 715/507 |
| 2005/0075544 A1 | * | 4/2005 | Shapiro et al. | 600/300 |

OTHER PUBLICATIONS

Sergey Blyashov, Auutomated Report Building System, U.S. Appl. No. 60/414,829, filed Sep. 27, 2002.*

* cited by examiner

*Primary Examiner*—Mohammad Ali
*Assistant Examiner*—Navneet K Ahluwalia
(74) *Attorney, Agent, or Firm*—Joseph R. Kelly; Westman, Champlin & Kelly, P.A.

(57) ABSTRACT

The present invention provides a system by which a user can define datasets and arrange those datasets into report sections. The reporting sections have a format that is user defined, and the report sections can be easily reused on different reports.

10 Claims, 27 Drawing Sheets

FIG. 5D

+ SALES  $200,000.00

+SALES-NE $100,000.00
+SALES-NW $100,000.00

+4100-001 $50,000.00
+4100-002 $50,000.00

+4100-002-001 $25,000.00
+4100-002-002 $25,000.00

4-1-2003   $12,500.00   3 CARS
4-5-2003   $12,500.00   2 CARS

FIG. 7

FilmWorks D mo
Balance Sheet
For the Four Months Ending April 30, 1996

ASSETS

| | |
|---|---:|
| Cash - Checking | $109,267 |
| Cash - Money Market | 46,518 |
| *Total Cash* | *155,785* |
| | |
| Accounts Receivable | 162,906 |
| Allowance For Bad Debts | (2,142) |
| Intl Corp Receivable | 268,528 |
| *Net Accounts Receivable* | *429,292* |
| | |
| *Total Inventories* | *698,075* |
| | |
| *Prepaid Assets* | *3,462* |
| Current Assets | 1,286,614 |
| | |
| Leasehold Improvements | 69,600 |
| Office Furniture And Fixtures | 34,500 |
| Office Equipment | 37,700 |
| Less Accumulated Depreciation | (35,780) |
| *Net Fixed Assets* | *106,020* |
| Total Assets | $1,392,634 |

FIG. 9E

LIABILITIES AND SHAREHOLDERS' EQUITY

| | |
|---|---:|
| Accounts Payable | $86,742 |
| Accrued Liabilities | 108,689 |
| *Total Current Liabilities* | *195,431* |
| | |
| Leases Payable | 10,100 |
| Notes Payable | 144,178 |
| *Long-Term Liabilities* | *154,278* |
| Total Liabilities | 349,709 |
| | |
| Capital Stock | 50,000 |
| Additional Paid-In Capital | 500,269 |
| Year-to Date Income | 295,556 |
| Retained Earnings | 197,100 |
| Shareholders' Equity | 1,042,925 |
| Liabilities and Equity | $1,392,634 |

FIG. 10D

FilmWorks Demo
Side by Side Balance Sheet
For the Four Months Ending April 30, 1996

| ASSETS | | | LIABILITIES AND SHAREHOLDERS' EQUITY | |
|---|---|---|---|---|
| Cash - Checking | 109,267 | | Accounts Payable | 86,742 |
| Cash - Money Market | 46,518 | | Accrued Taxes | |
| | | | Accrued Liabilities | 108,689 |
| Total Cash | | 155,785 | Suspense Account | |
| Accounts Receivable | 162,906 | | Total Current Liabilities | 195,431 |
| Allowance For Bad Debts | (2,142) | | | |
| Intl Corp Receivable | 268,528 | | Leases Payable | 10,100 |
| | | | Notes Payable | 144,178 |
| Net Accounts Receivable | | 429,292 | | |
| | | | Long-Term Liabilities | 154,278 |
| Total Inventories | | 698,075 | | |
| | | | Total Liabilities | 349,709 |
| Prepaid Assets | | 3,462 | | |
| Current Assets | | 1,286,614 | Capital Stock | 50,000 |
| | | | Additional Paid-In Capital | 500,269 |
| Leasehold Improvements | 69,600 | | Year-to Date Income | 295,556 |
| Office Furniture And Fixtures | 34,500 | | Retained Earnings | 197,100 |
| Data Processing Equipment | | | Treasury Stock | |
| Office Equipment | 37,700 | | | |
| Less Accumulated Depreciation | (35,780) | | Shareholders' Equity | 1,042,925 |
| Net Fixed Assets | | 106,020 | | |
| Total Assets | | 1,392,634 | Liabilities and Equity | 1,392,634 |

SYSTEM FOR DESIGNATING GRID-BASED DATABASE REPORTS

BACKGROUND OF THE INVENTION

The present invention deals with database reporting systems. More specifically, the present invention deals with a system which enables user-defined formatting for report sections that can be re-used in different reports.

People in finance and accounting departments of companies have many responsibilities. One of the most important responsibilities is to provide financial and management information to stakeholders in the company. The stakeholders require the information on a frequent basis due to the time sensitive nature of the data. In addition, statutory financial reports are required on a formal schedule which can be managed. However, the time frame between closing and distribution is relatively short.

The financial information that is the subject of these reports is not only time sensitive, but it is difficult and time consuming for the finance and accounting department to produce with generic reporting tools or disconnected spreadsheet tools. These tools fail to handle seamless integration in a financial context, and also deliver the unique formatting and conditional formatting requirements imposed by financial calculations.

In the past, database reporting has been quite cumbersome. Different items of information from a database are needed for different types of reports. Also, different users have different preferred formats for the reports generated.

For instances, typically, when defining a report (such as a financial report) the person generating the report must first define the columns which are to be used in the report. An example of columns may be (for example, for aged accounts receivable) a customer name, and then columns of aged accounts receivable which are aged by a certain period, such as 30 days, 60 days, 90 days, etc. When the report is generated, the database system executes a query against a database and expands the rows with the appropriate data. In the example being discussed, the database system will expand the rows to include customer names and then accounts receivable for each of those customers which are 30 days old, 60 days old, and 90 days old, etc.

Also, in previous systems, in order to generate a report, row sets could be defined to appear in the report, as could column sets. Therefore, while different rows and columns could be defined to appear in the report, the user defining the report could not see where the information would appear in the report until the report was actually generated. This is not only time consuming, but is quite cumbersome for a user who is attempting to define a report that needs to be generated.

Similarly, in prior reporting systems, data types were typically defined as part of a row set. For example, a user would define "cash" as having certain inclusions or exclusions in a row set. Therefore, every time the definition of "cash" changed, the user would need to update every reference to cash in the reports.

It can thus be seen that prior reporting systems were difficult to use, because the user could not be presented with a visualization of the report prior to actually generating the report. Prior reporting systems also required a great deal of work in maintaining and updating the reporting system, as definitions of data types changed.

SUMMARY OF THE INVENTION

The present invention provides a system by which a user can define datasets and arrange those datasets into report sections. The reporting sections have a format that is user defined, and the report sections can be easily reused on different reports.

In one embodiment, the user defined format for the report sections can simply be dragged and dropped onto a visual representation of a report so that the user is presented with a visual presentation of what the report will look like, prior to actually running the report.

In another embodiment, the present invention also includes a report definition which acts as a template for the visual presentation of an entire report. The report definition includes one or more report sections, and shows where the report sections are placed relative to one another in the report. Therefore, again, the user receives a visual indication of how the report will look, prior to actually running the report.

BRIEF DESCRIPTION OF THE DRAWINGS

FIGS. 5A-5E illustrate a definition of a report section.

FIG. 7 shows a sales data hierarchy.

FIGS. 9A-9E illustrate another embodiment of a user interface used to define a report.

FIGS. 10A-10D illustrate re-use of report sections.

DETAILED DESCRIPTION OF ILLUSTRATIVE EMBODIMENTS

The present invention deals with a report definition system. More specifically, the present invention deals with a system that enables a user to define report sections that are reusable among different reports. The present invention also deals with a system that defines reports in multiple different sections, including datasets, report sections and report definitions and provides the user with a visual representation of a report as it is being defined. However, prior to discussing the present invention in greater detail, one illustrative embodiment of an environment in which the present invention can be used will be discussed.

Figure 1:
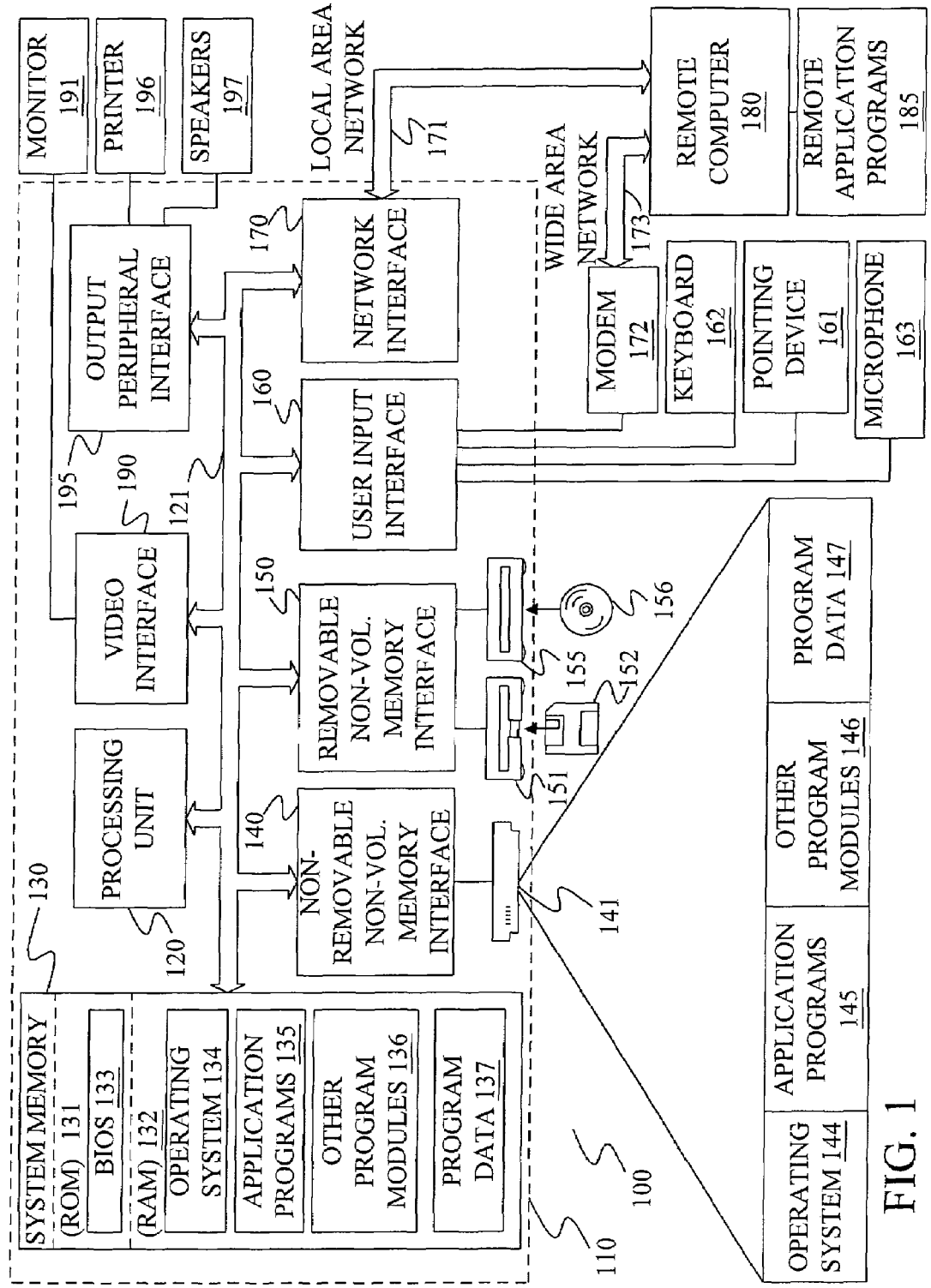
FIG. 1 is a block diagram of one illustrative embodiment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
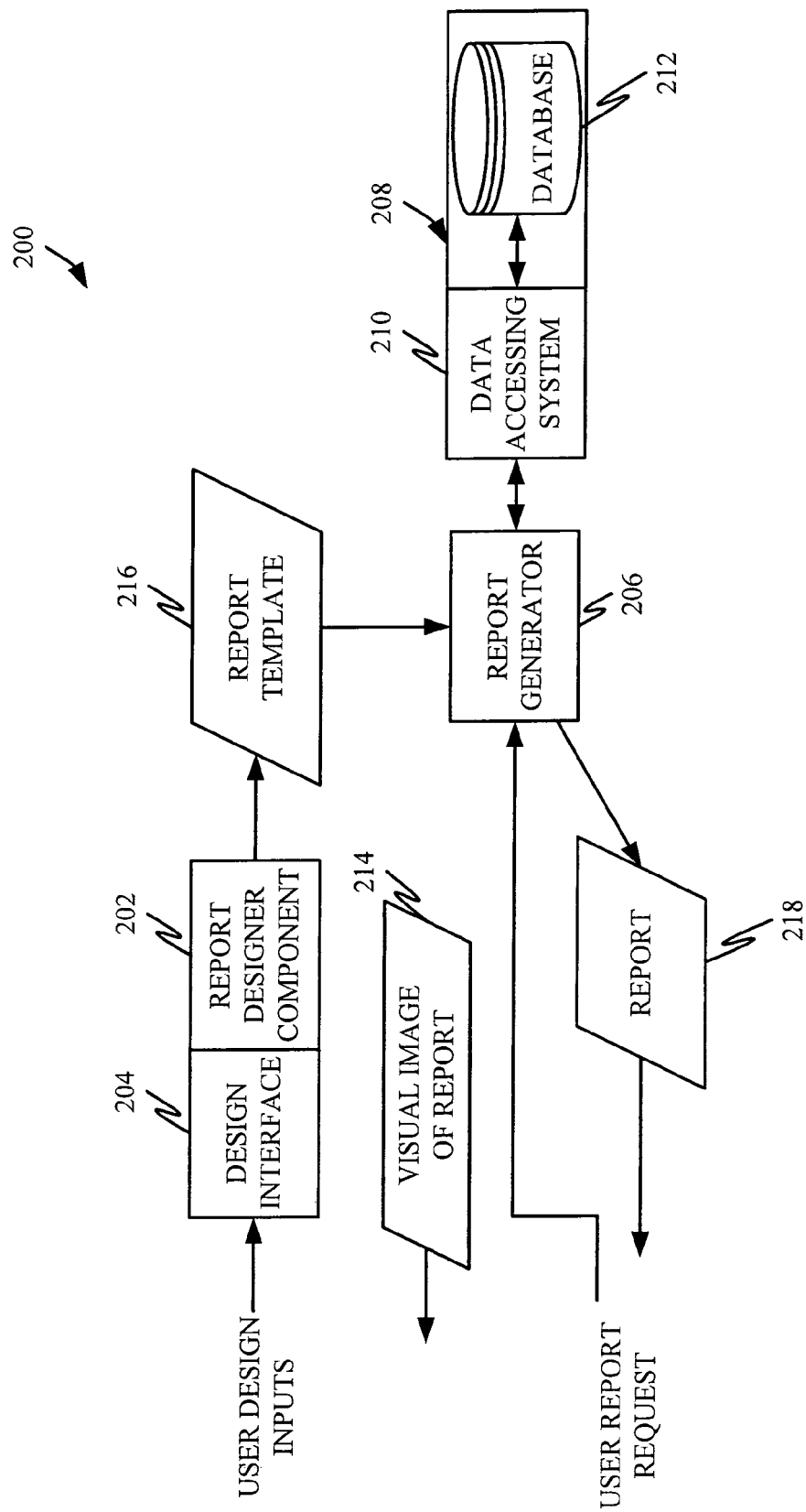
FIG. 2 is a block diagram of a report designating and generating system.

FIG. 2 is a block diagram of one embodiment of a report design and generation system 200. System 200 illustrates report design component 202 which exposes a design interface 204 for use by report design personnel. System 200 also includes report generator 206 and database system 208. Database system 208 includes a data accessing system 210 and database 212. In one embodiment, data accessing system 208 is a relational database accessing system, such as a structured query language (SQL) database system.

In order to design a report, a user provides user design inputs to report design component 202 through design interface 204. The user design inputs define the types of data that are to be included in the report, as well as the format of various report sections to be included in the report, and in addition, the overall report format for the report. Report design component 202 receives those inputs and provides a visual representation 214 of the report defined by the user. In response to seeing the visual image of the report, the user can provide additional inputs to change or add components in the report being defined. Of course, report design component 202 will change visual image 214 accordingly.

Once the user has fully defined a report, the fully defined report exists as a report template 216. Report template 216 provides a definition of the datasets and report sections to be included in the report, as well as an overall report definition which indicates where the report sections are to be placed in the report definitions.

When the user wishes to actually run the report, the user provides a user report request to report generator 206. Report generator 206 illustratively has access to the report templates 216 created by the user. Based on those templates, report generator 206 queries database system 208. Specifically, data accessing system 210 illustratively receives the query criteria and executes a query against database 212. The data is returned to report generator 206 which generates report 218 based on the report template 216 corresponding to the requested report.

Figure 3:
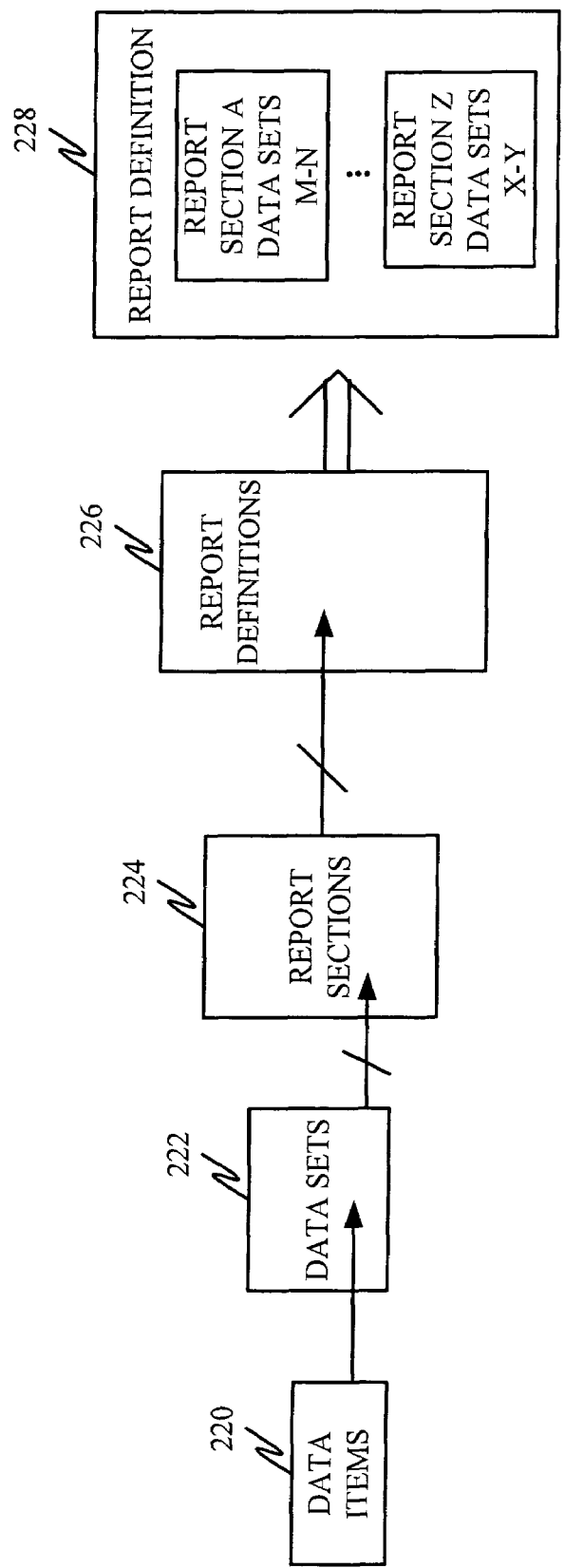
FIG. 3 illustrates components of a defined report.

FIG. 3 diagrammatically illustrates how reports are defined in accordance with one embodiment of the present invention. The items shown in FIG. 3 are illustratively defined by the user design inputs provided to report designer component 202 through design interface 204.

First, the user examines the relevant, available data items 220. The data items are the specific items of data (or data types) that the user wishes to have in the report. The data items 220 are not the data itself, but are instead indicators of the type of data to be included. An example of a specific data item 220 to be included in a report, for example, is a sales figure, or a figure indicative of an amount of cash in a checking account. These are discussed in more detail below.

The user defines the particular data items 220 to be included in datasets 222. The datasets 222 are defined to include one or more data items 220.

The user then defines report sections 224. The report sections 224 illustratively include one or more datasets. The user illustratively identifies where the datasets 222 will reside in report sections 224. This is done, for example, by dragging already defined datasets from one portion of an input displayed on a display screen to another portion of the display (using for example, a mouse) and then dropping the datasets on the report section displayed on the display where the user desires them to reside in a report section 224.

Once report sections 224 are defined, the user then goes on to define the entire report using a report definition 226. The report definition 226 is created by defining where one or more report sections 224 will reside within the overall report. Again, this is illustratively done by simply dragging and dropping already defined report sections from one part of the user input display to another, using a user input device, such as a mouse.

The result is a fully defined report definition 228. Report definition 228 shown in FIG. 3 shows that report section A includes datasets m-n and is located at an upper portion of the display screen. Report definition 228 also shows that report section Z includes datasets x-y and resides below report section A. Of course, any desired number of report sections, each including any of a desired number of datasets, can be defined for a report definition. In addition, as described in more detail below, other items, such as headers, images, labels, etc. can be dragged and dropped onto report definition 228 to define the overall report.

Figure 4A:
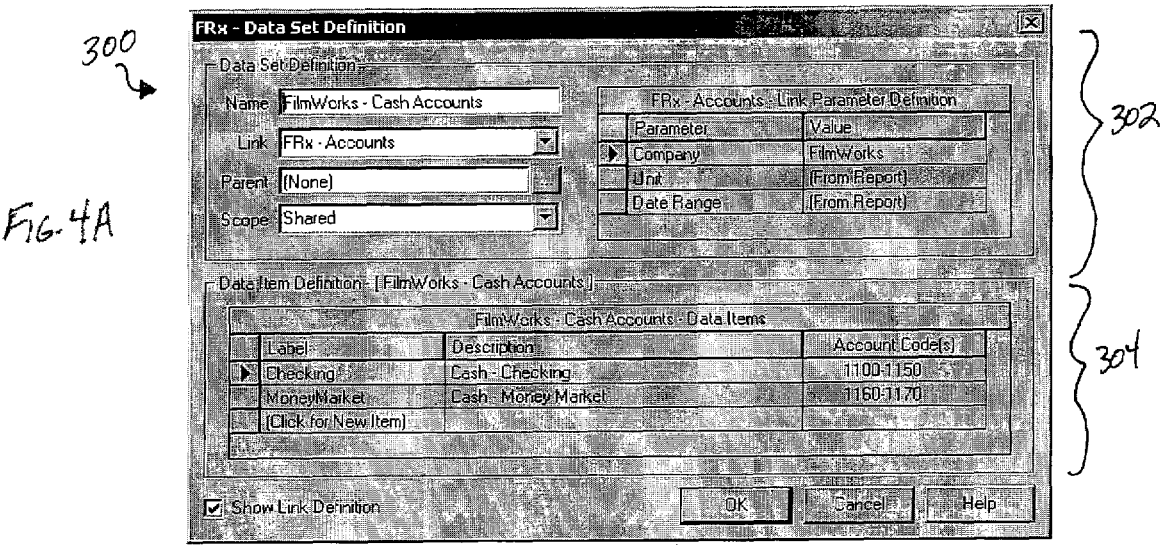
FIGS. 4A and 4B illustrate embodiments of a dataset definition.
Figure 4B:
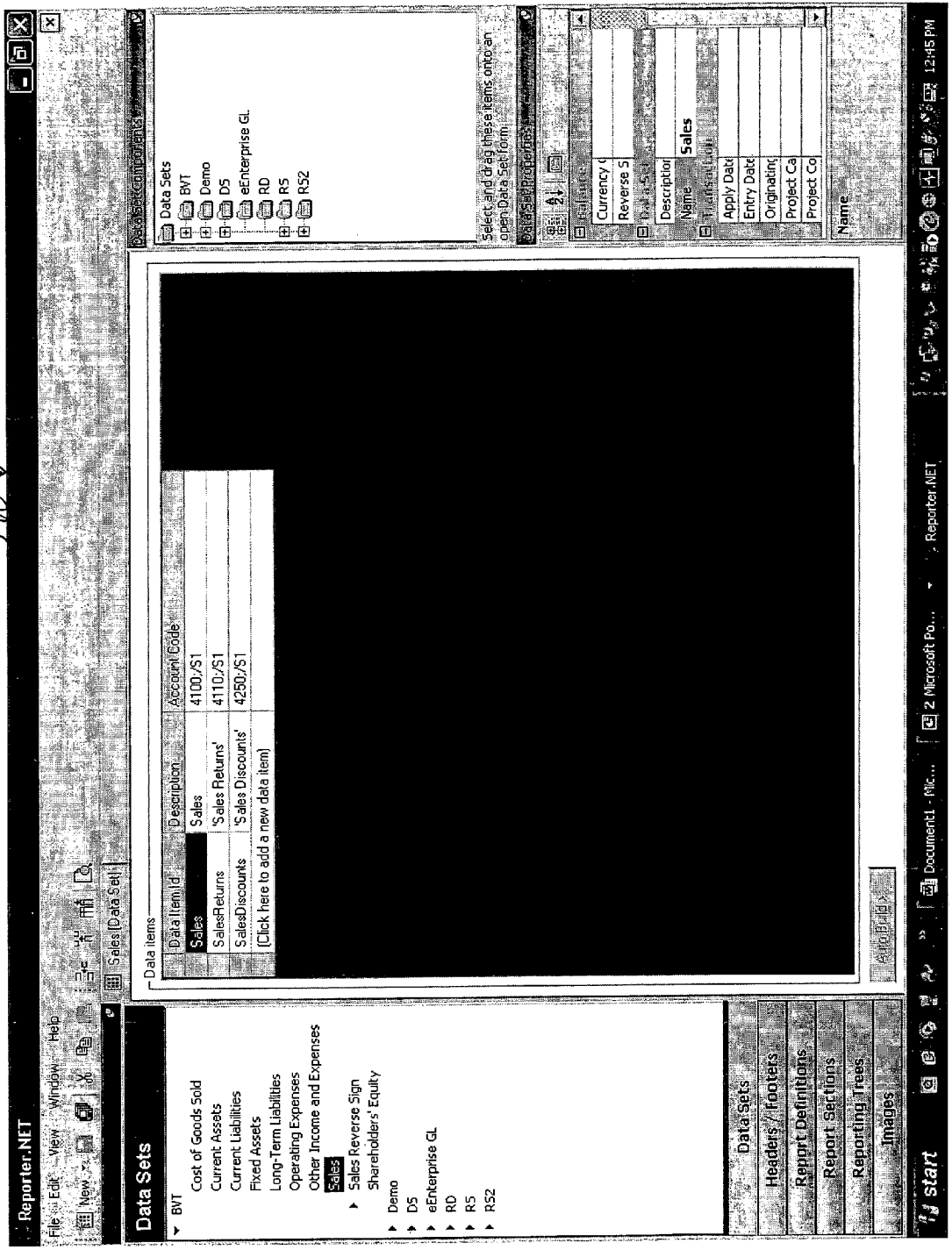

FIGS. 4A and 4B illustrate two illustrative embodiments for defining a dataset. In FIG. 4A, the user illustratively clicks on a button on the graphical user interface to create a New dataset. This brings up the dataset definition dialog 300 shown in FIG. 4A. Dialog 300 is used to specify the parameters required for a dataset. Dialog 300 illustrates that the user can provide information to define the parameters 302 for the dataset as well as the data items 304 for the dataset. The parameters 302 can illustratively include a name which the user enters, a link which defines the general type of data retrieved, and also can illustrate a general source of the data (such as a general ledger from which the data is being retrieved). The parameters can also indicate whether the data has a parent object and whether the data can be shared with other personnel, or is proprietary to the creator of the dataset.

The upper right side of dialog 300 shows another set of parameters that refer to additional items that are the same for the entire dataset. The Company parameter defines a company from which the values are to be retrieved. The Unit and Date range parameters are set to "from report" which means that their values are passed in from the overall report definition when a report is actually executed, as will be discussed below. Of course, the Unit and Date Range values can be explicitly set as well.

The Data Items section 304 of dialog 300 indicates the line items that must be retrieved in the context of this dataset. All of the line items are pulled in the context of the parameters specified in the Link field illustrated in the upper portion of dialog 300. In the example illustrated, the line items include a label, a description and an account code. These column headings are defined by the Link set out above, because these are the columns which can be retrieved from the $FR_x$ Accounts Link. If the data is to be retrieved from another data source, that data source would be identified by the Link parameter and it would have its own column headings.

The line items listed include a Cash account data item, such as cash balance in a checking account and a money market. The descriptions show that both are cash accounts, and the account codes correspond to the specific accounts used. The last line item is entitled "Click for New Item" and allows the user to enter an additional data item into this dataset by simply clicking that field and entering the desired data.

FIG. 4B illustrates another embodiment of a user interface for defining datasets. FIG. 4B shows Dataset screen 310. The upper left-hand corner of screen 310 includes a "New" button. By clicking this button, a screen opens to allow the user to define a New dataset. An already-defined dataset is shown, and is a Sales dataset. The data items listed in the Sales dataset include Sales, Sales Returns and Sales Discounts, each with their own data item ID, description and account code. Again, additional data items can be added by clicking the appropriate portion of the Dataset screen.

Figure 4C:
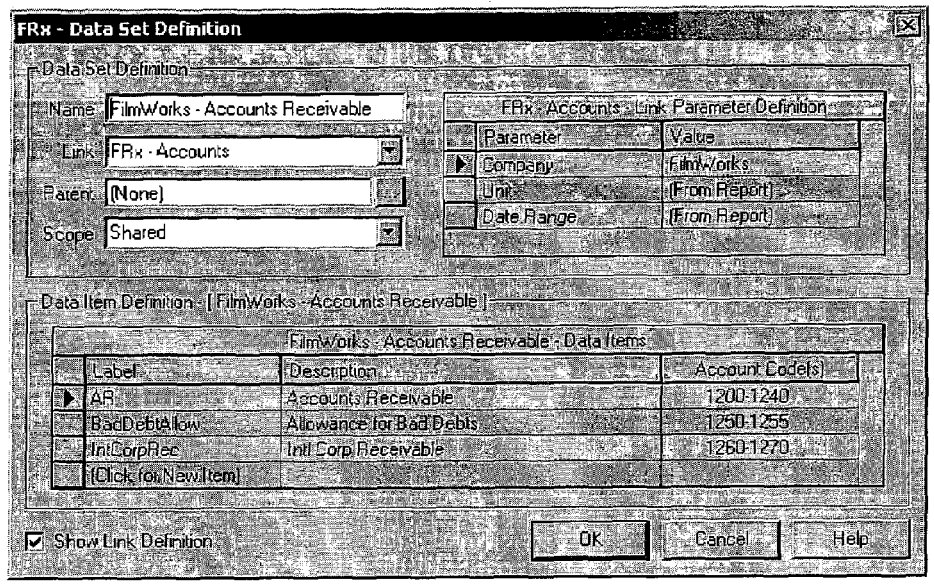
FIGS. 4C-4H illustrate further exemplary datasets.
Figure 4D:
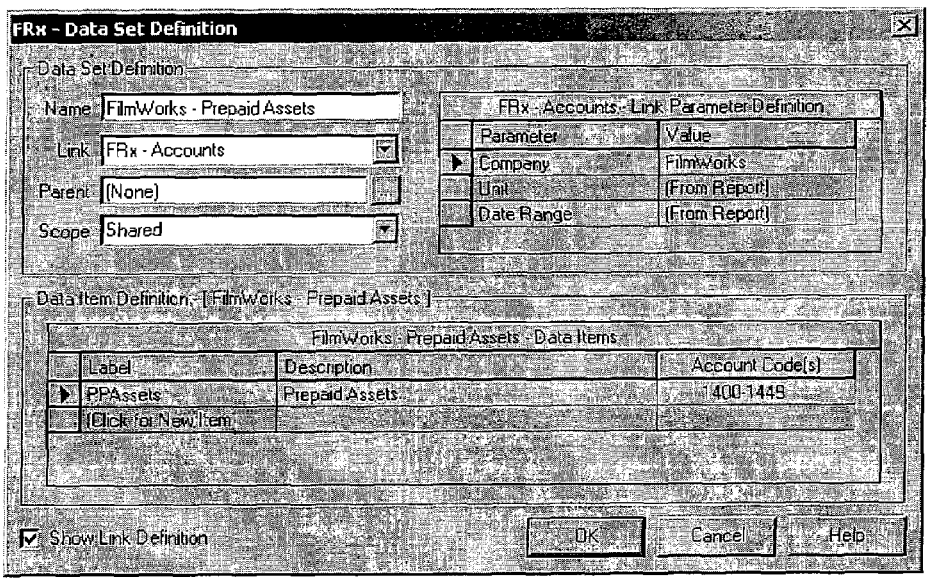
Figure 4E:
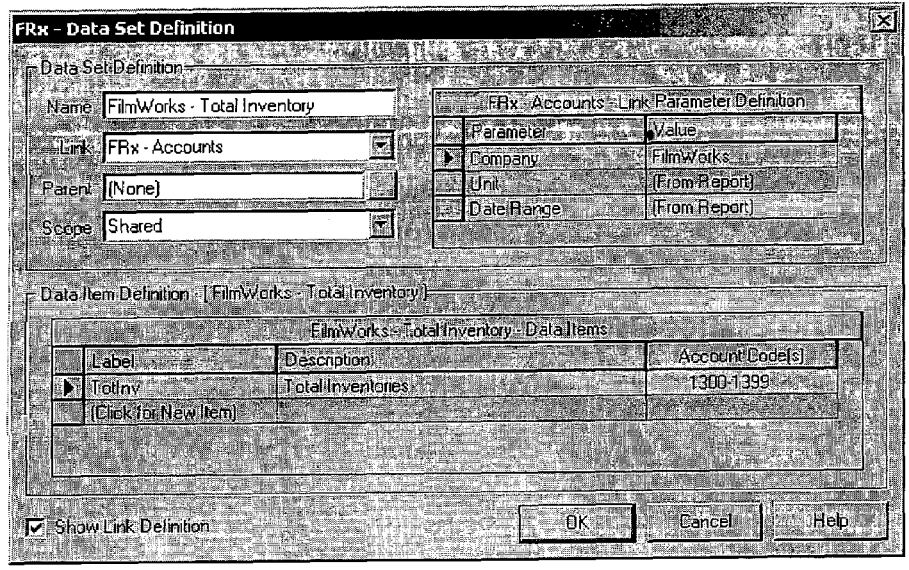
Figure 4F:
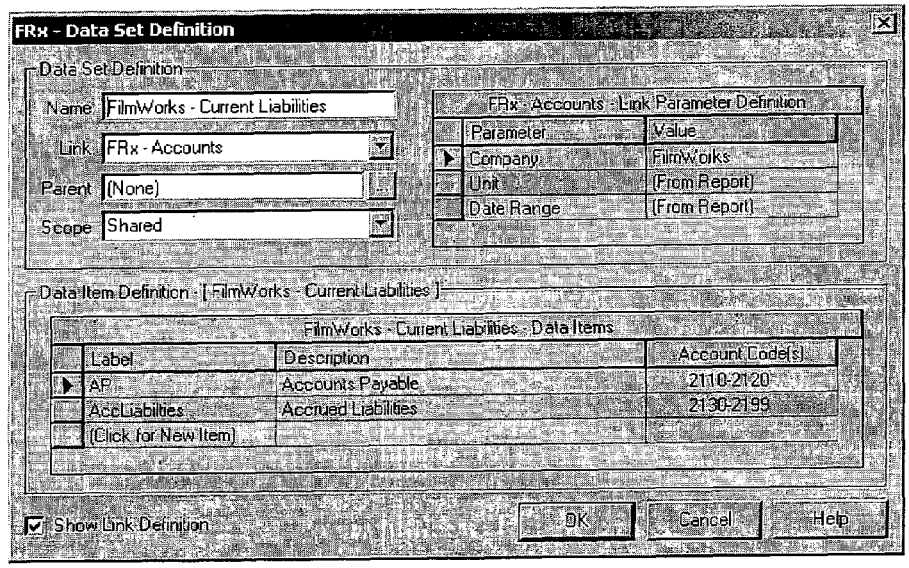
Figure 4G:
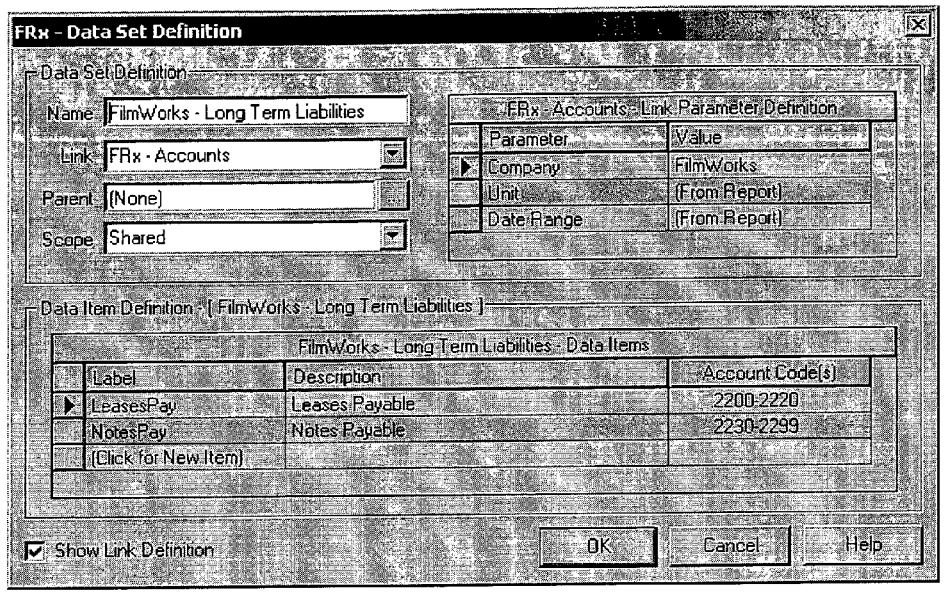
Figure 4H:
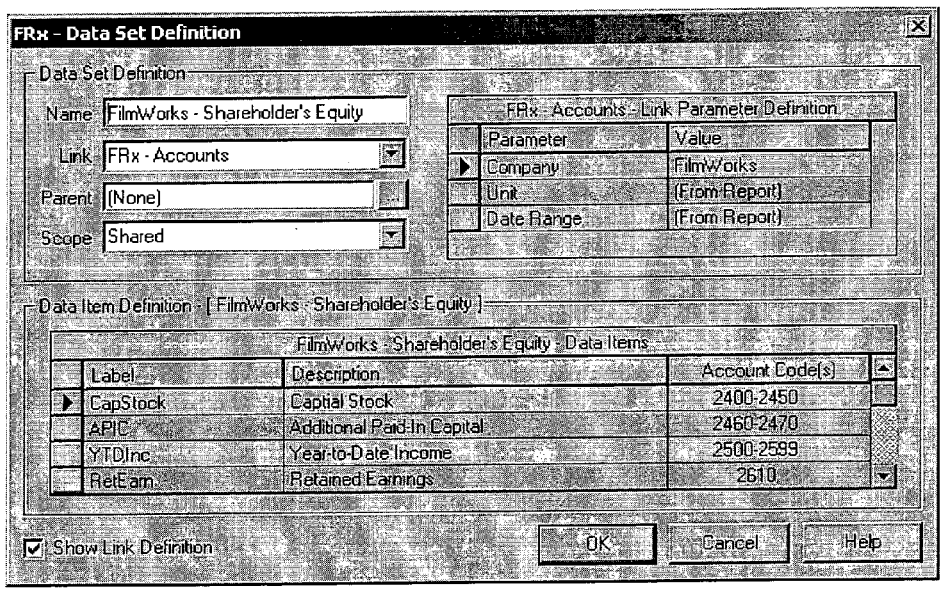

FIGS. 4C-4H illustrate further embodiments of dataset definitions. FIG. 4C illustrates an accounts receivable dataset. FIG. 4D illustrates a prepaid assets dataset. FIG. 4E illustrates a total inventory dataset. FIG. 4F illustrates a current liabilities dataset. FIG. 4G illustrates a long term liabilities dataset, and FIG. 4H illustrates a shareholders equity dataset. Of course, these are exemplary only and many additional or different datasets can be defined as well.

Figure 5A:
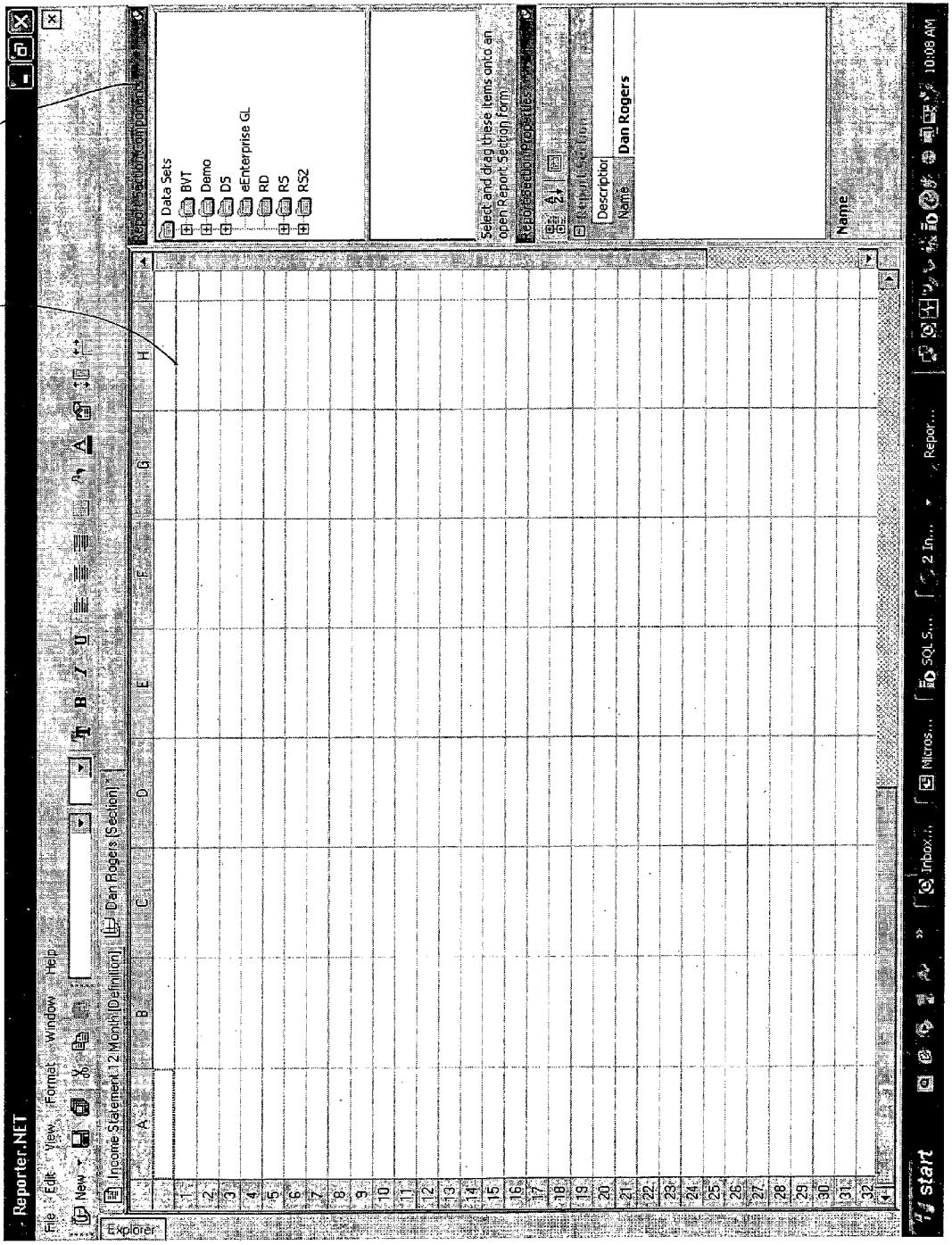

Once the desired datasets are defined, they are then illustratively arranged into report sections. This can be initiated, for example, by clicking on the "Report Sections" tab in the lower left corner of screen 310 shown in FIG. 4B. When this is done, the user will be provided with a screen allowing them to pick any of a wide variety of different types of report sections. FIG. 5A shows that the user has selected an income statement for 12 months as the desired report section. FIG. 5A shows that report designer component 202 provides a visual image 214 to the user in the form of screen display 350. Screen display 350 includes a grid structure portion 352 and a field 354 which illustrates report section components that can be used to prepare a report section. The report section components are those which can be placed on grid structure 352 to create a report section that can be used in reports. In the embodiment illustrated, the report section components are datasets that have already been defined by the user.

Figure 5B:
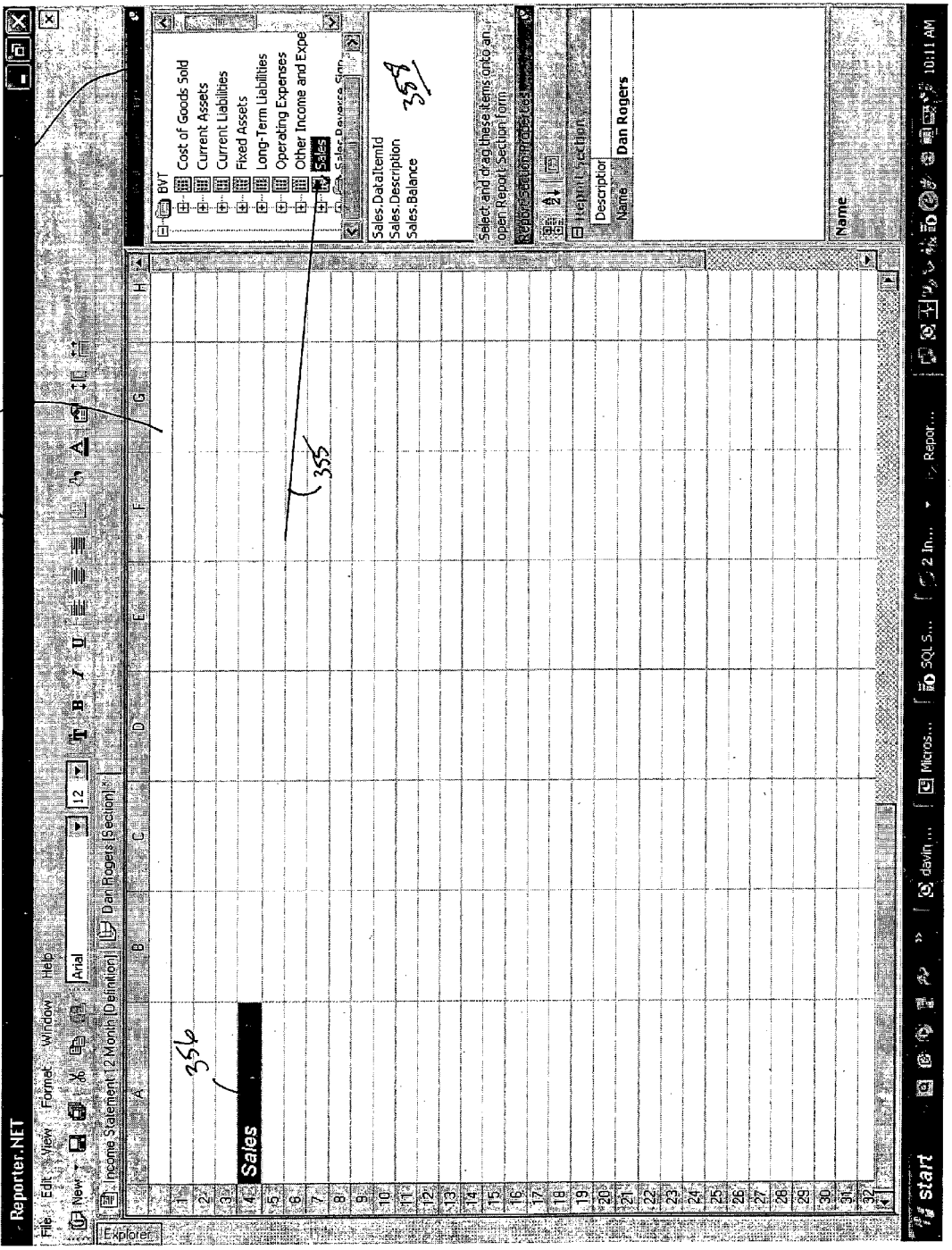

FIG. 5B shows display screen 350 after the user has selected the "BVT" menu item under the "Data Set" of the "Data Set Component" field 354. The user then highlights a grid 356 in grid structure 352 and then highlights the "Sales" dataset under the BVT menu item in report section component field 354, as indicated by arrow 355. Upon highlighting the "Sales" dataset, two things happen. First, the description "Sales" appears in selected grid 356. Also, selectable portions of the highlighted dataset (the "Sales" dataset) appear in field 358 immediately below the report section components field 354. In the embodiment shown in FIG. 5B, there are three selectable items which include the DataItemId, the Description, and the Balance, associated with the Sales dataset highlighted in field 354.

In FIG. 5B, report section component field 354 shows that, in addition to the sales dataset, a variety of other datasets have been created by the user, such as cost of goods sold, current assets, current liabilities, fixed assets, long-term liabilities, and other income and expenses, etc. Of course, a wide variety of other datasets could be available as well. Similarly, the datasets illustrated in field 354 can be grouped. For instance, all expenses could be grouped into a report section component referred to as "expenses". This is simply entered into the tree structure in field 354 and the "expenses" datasets are then displayed to depend from that node in the tree structure. Other groups can be formed in the same way.

Figure 5C:
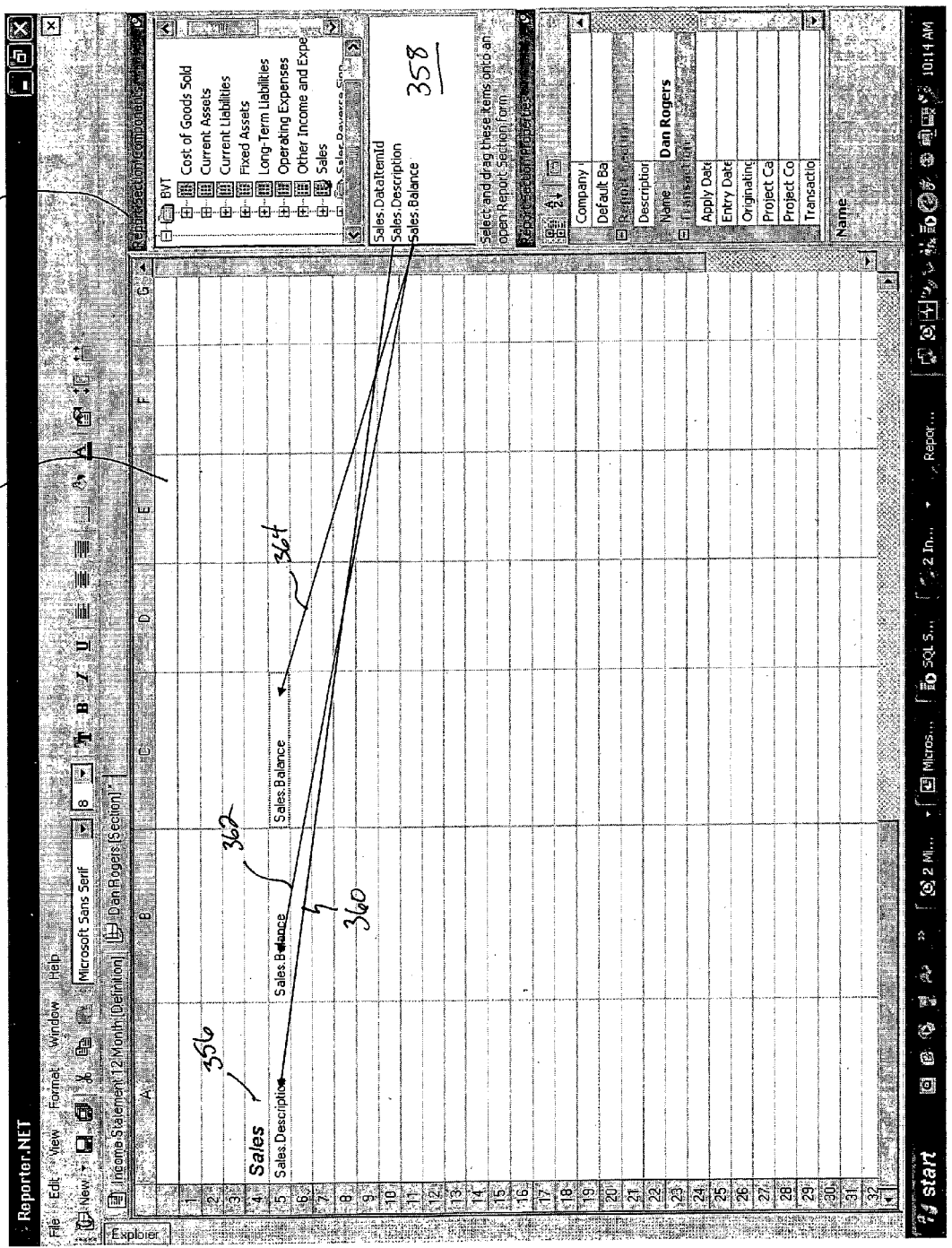

In order to define the report section, the user simply drags selectable items from field 358 into grid locations on grid structure 352. FIG. 5C shows that the user has dragged three instances of items from field 358 onto grid structure 352. The user has dragged the sales Description item and two sales Balance items. This is indicated by arrows 360, 362 and 364. Each of the items that was dragged onto grid structure 354 is dropped in a separate grid space. In one embodiment, the grid spaces are identified by letters along the top of the grid structure and numbers down the side of the grid structure. Thus, the three items dragged from field 358 are located in grid locations A5, B5 and C5, respectively.

Figure 5D:
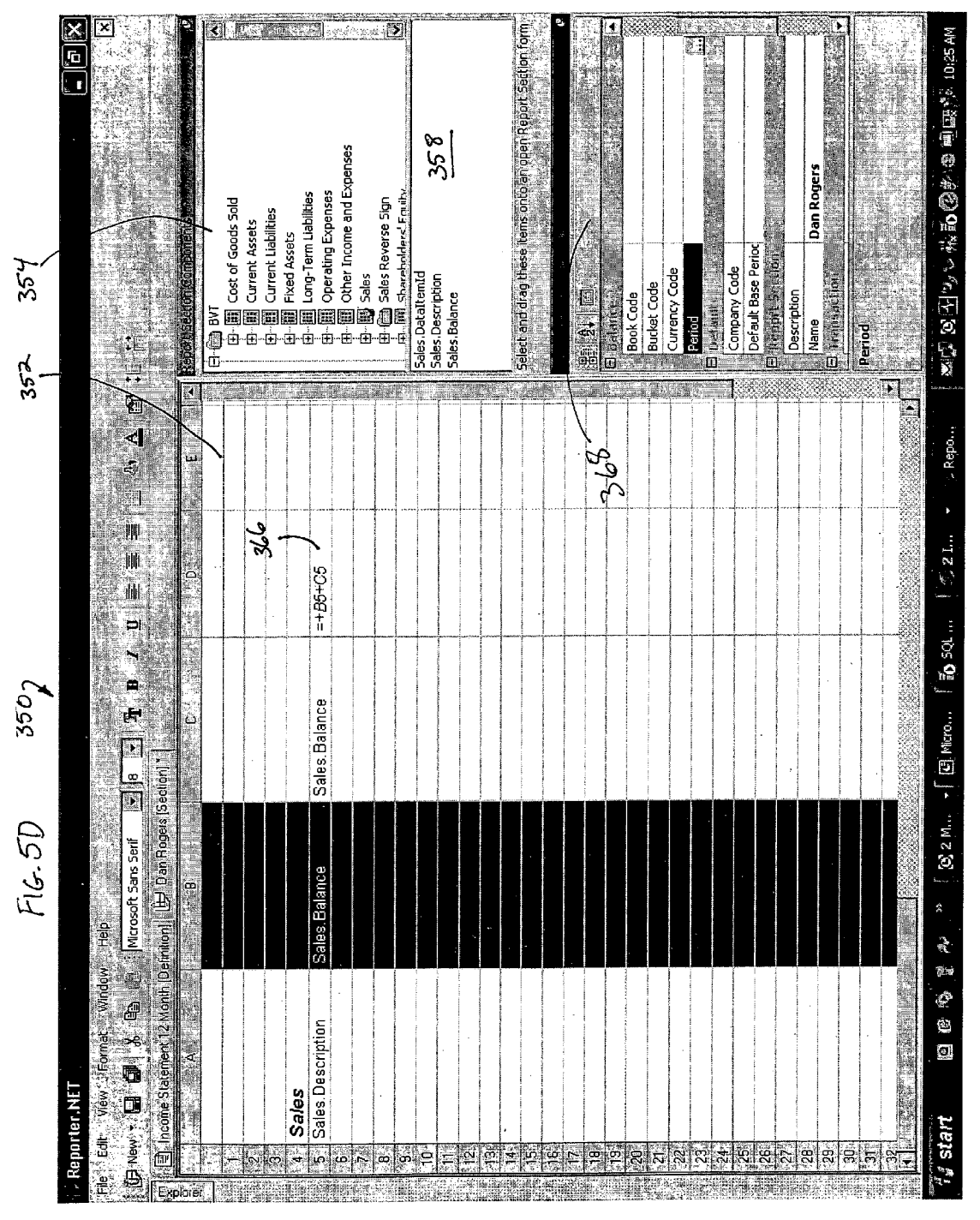

FIG. 5D illustrates a next step in defining a report section. FIG. 5D illustrates a number of changes from that shown in FIG. 5C. First, the user has entered an operation 366 in grid location D5. The operation indicates that grid location D5 will contain the sum of the values found in grid locations B5 and C5. In a manner similar to a conventional spread sheet, these items will be added and displayed in grid location D5 when the report is actually run.

Figure 5E:
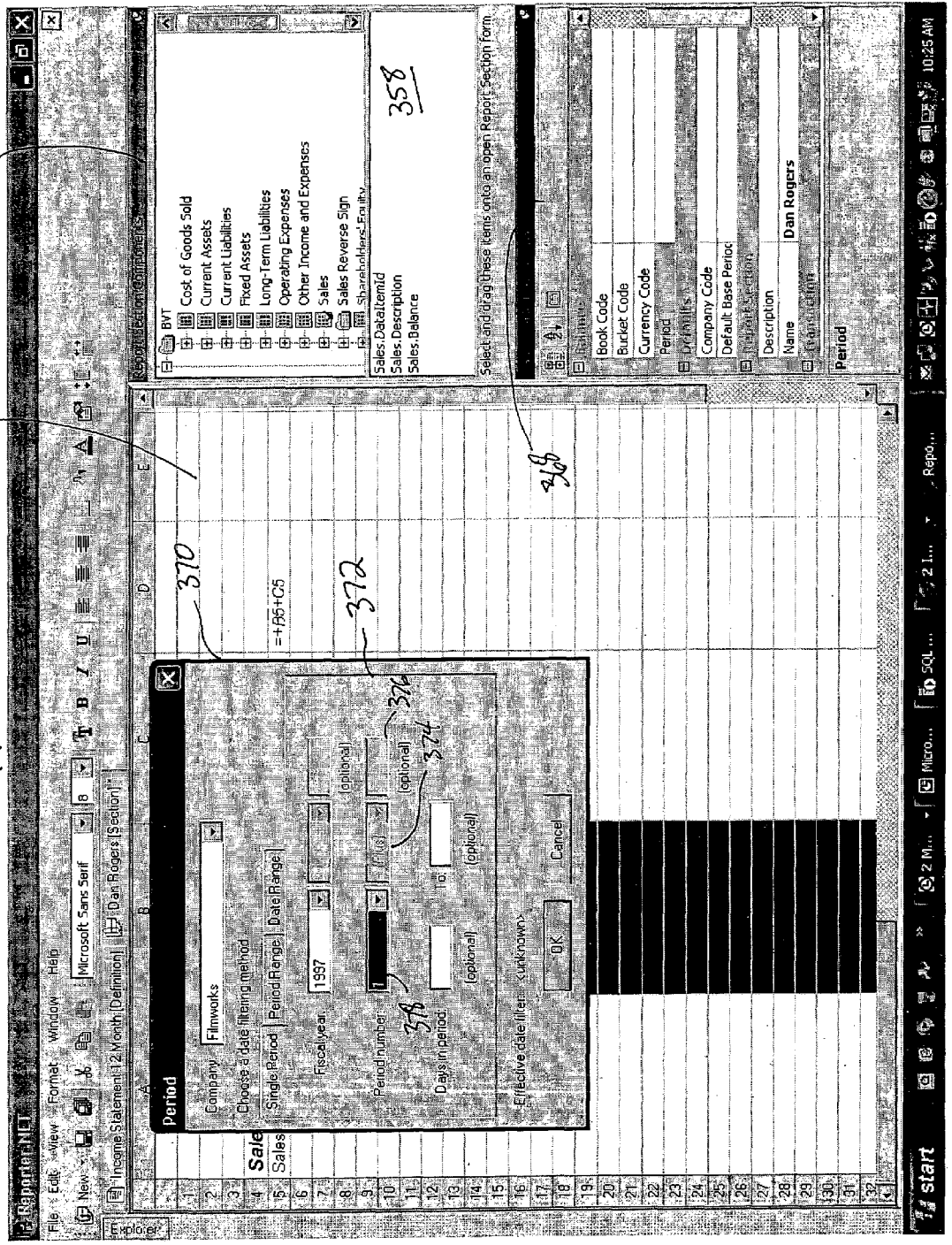

FIG. 5D also shows that the entire B column in grid structure 352 has been highlighted and the report section properties found in field 368 has been manipulated to highlight the property Period. This indicates that all of the sales balance figures found in column B will have a Period property defined therefore. FIG. 5E shows a dialog box 370 which is displayed to allow the user to select the period property corresponding to the sales balance figures in column B. A number of items in dialog box 370 are worth noting. The first is that the period dialog box 370 includes a Company indicator that identifies the company for which the period is being defined. The period is then defined more specifically in section 372.

There are three different tabs in the embodiment shown in section 372 which allow the user to set a period. The first is a single period which has been selected. The period selected corresponds to fiscal year 1997 and is identified as the first period defined. The user can also enter a certain number of days in the period as well. In addition, the user can define the period using fields 374 and 376. This is referred to as defining the period by using a "base period". It can be used by the user to define a revolving period, which revolves in time. For example, if in the period number box 378, the user entered the "current" fiscal year, and manipulated field 374 to indicate "plus" and entered a 1 in field 376, then the period parameter would essentially define the period as the base period (the current period) plus one month, one year, one day, etc. as specified.

In addition, the user can select period range by clicking the second tab in section 372 or could optionally select a date range by clicking the third tab in section 372.

In any case, once the user has defined the period for column B on grid structure 352, that definition is indicated in the report section properties field 368. This property is used to define a query that will be executable against the database when the report is actually run.

All of the other parameters or properties that further define the datasets and can be used to filter database queries for returning data and populating the report, are illustratively set by imply highlighting them in properties field 368 and then entering the desired properties or parameters either directly into field 368, or through a dialog box, such as 370 used to set the period property.

Once all of the desired report sections have been defined, the overall report definition can be made. This can be initiated, for example, by selecting the "Report Definitions" tab in the lower left-hand corner of the screen shown in FIG. 4B. Then, when the "New" button is selected in the upper left-hand corner of the screen, a report definition canvas is displayed for the user. One such report definition canvas is illustrated at 400 in FIG. 6A.

Figure 6A:
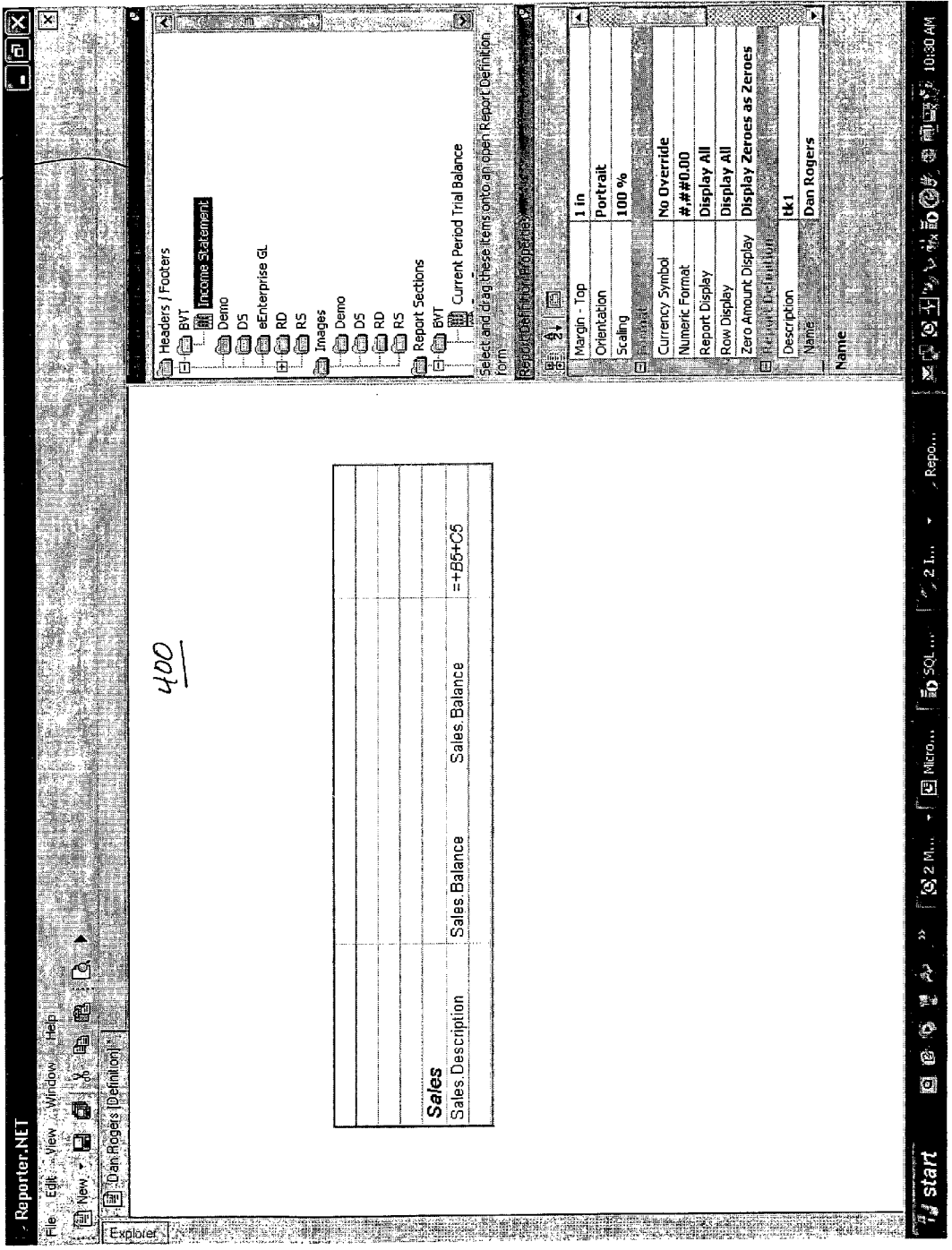
FIGS. 6A-6C illustrate a report definition.

FIG. 6A also shows that the report section components field 354 has now been replaced by the report definition components 402. These components are components which can be dragged and dropped from field 402 onto canvas 400 at a place desired by the user. FIG. 6A shows that the income statement defined in the previous figures has been selected from field 402, dragged and dropped onto canvas 400.

Figure 6B:
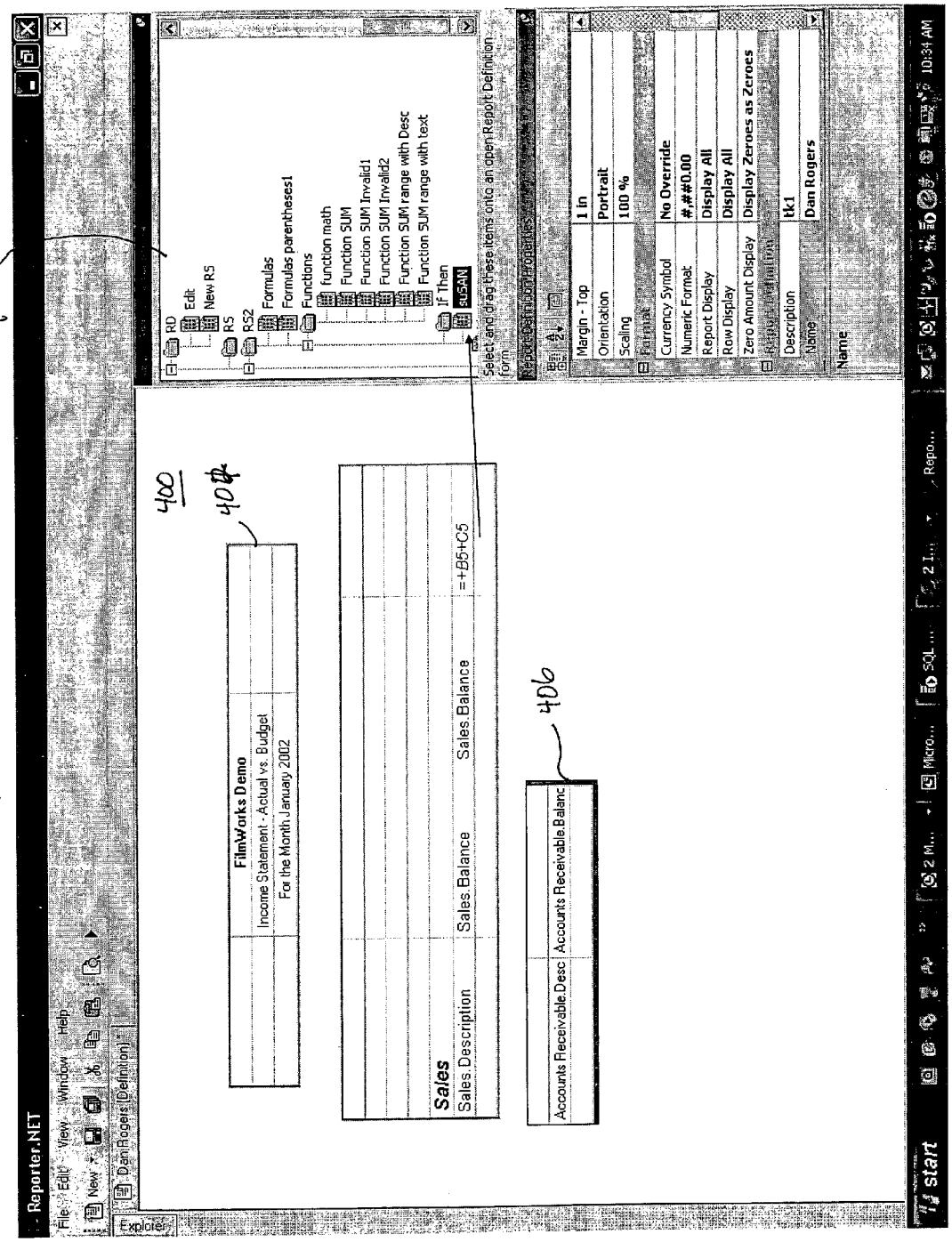

FIG. 6B shows that a number of other report definition components have been dragged and dropped onto canvas 400. FIG. 6B shows that a header 404 has been dragged and dropped onto canvas 400, as has an accounts receivable report definition component 406.

Figure 6C:
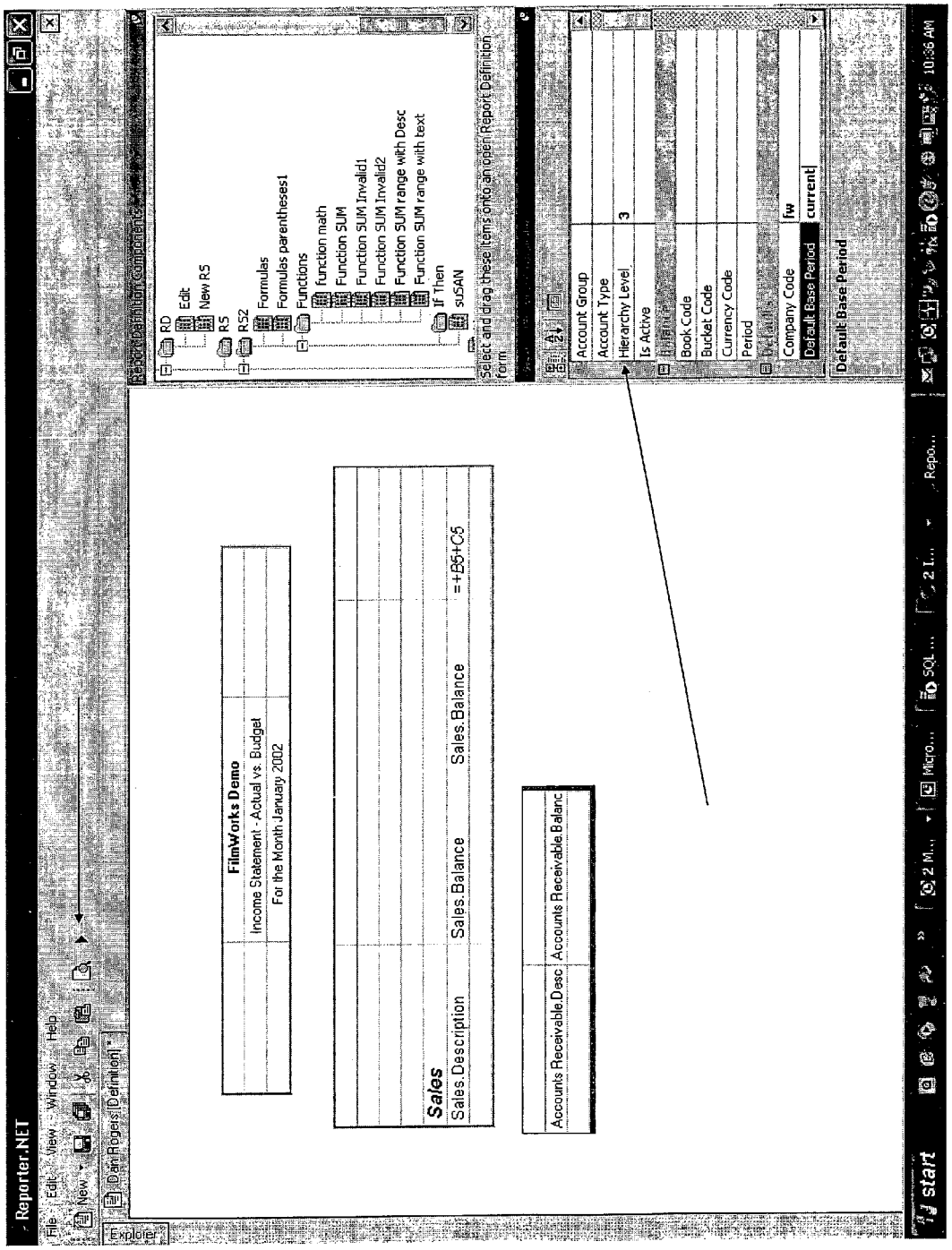

FIG. 6C illustrates another property which can be set. The property for the report definition illustrated by FIG. 6C is the "hierarchy level" property. This defines how many levels of data will be displayed in the report, when it is first generated. For instance, FIG. 7 illustrates a hierarchy of data for sales. The highest level is simply a sales figure which corresponds to, for example, total sales. However, it may be that the general ledger from which the data is being retrieved actually brakes the sales figure into a plurality of different hierarchical levels. One level may be region. Therefore, the next level under Sales is sales by region, including Sales-Northeast and Sales-Northwest. Further, the general ledger breaks sales into general account numbers (such as 4100-001, and 4100-002) and then into even more specific account numbers (such as 4100-002-001 and 4100-002-002). Further, the general ledger illustratively breaks the sales down into individual transactions. Each of these hierarchical levels are shown in FIG. 7.

By setting the hierarchy level to three, that indicates that when the defined report is run and the sales are displayed, they will be displayed down through three levels of specificity (such as down to the general account number 4100-001 and 4100-002). However, each of those hierarchical levels displayed will have an indicator, such as a plus sign, located to the left thereof. Therefore, the user can select the plus sign indicator and a further hierarchical breakdown of the data will be displayed to the user. If the user continues to select the plus indicator, (or zoom indicator), the user can view all the way down to the lowest hierarchical level of data supported by the general ledger from which the data is retrieved.

Figure 8:
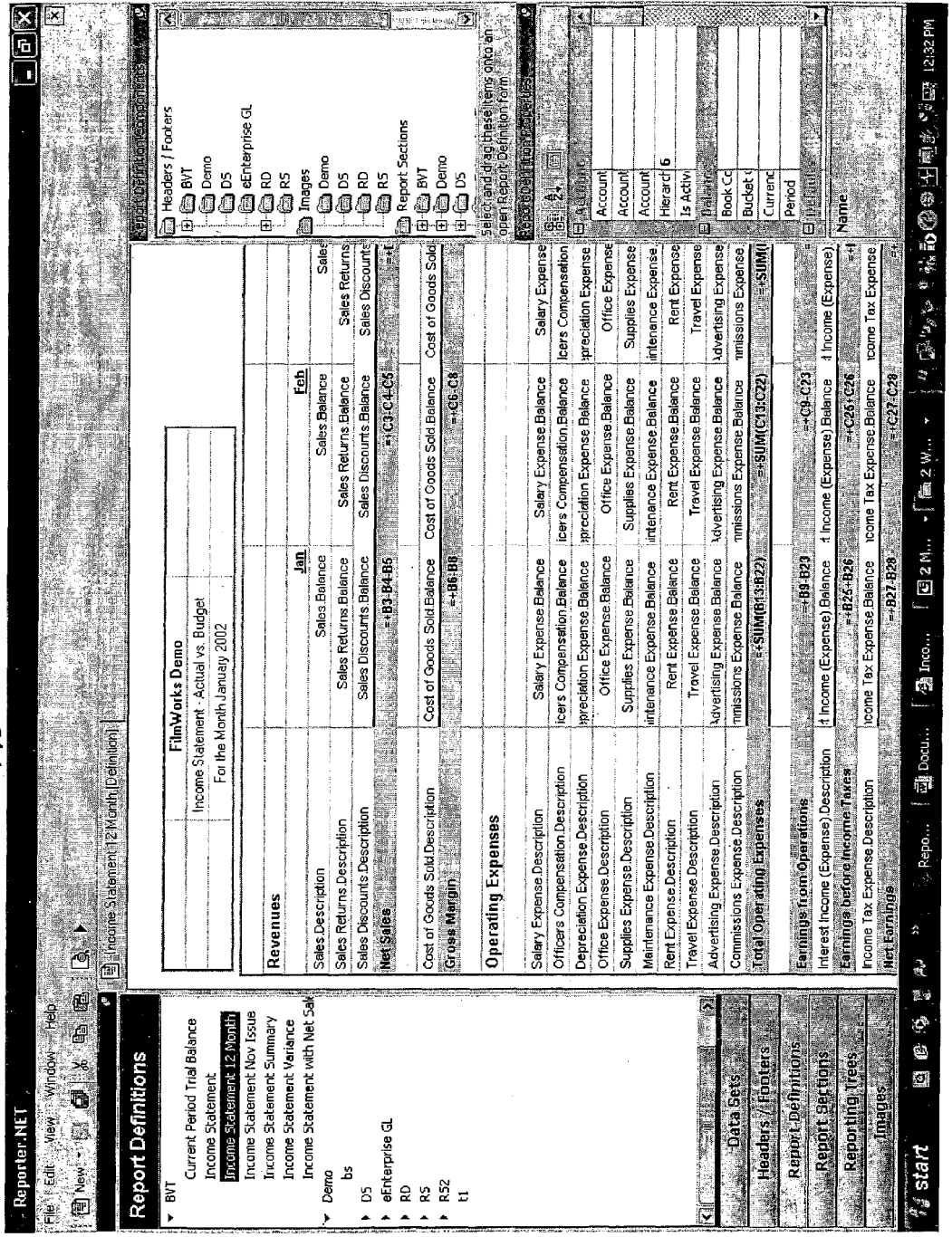
FIG. 8 shows another report definition.

FIG. 8 illustrates a more detailed report definition for an income statement. It can be seen that the datasets used to define the report definition components include, for example, revenues (which itself includes the report section sales), operating expenses, cost of goods sold, interest income, and income tax expense. The report definition shown in FIG. 8 is exemplary only, of course.

It can thus be seen that the user can easily configure data items into datasets and see how those datasets will appear on a report, prior to actually running the report. The user can then format report sections using the defined datasets. The report sections, in turn, can be used to define the report, in a report definition. As the user is defining each subelement of the report (datasets, report sections and report definitions) the user is provided with a visual indication of how the report will look once it is run. Similarly, in one embodiment, the user can define the datasets, report sections and report definitions by simply dragging and dropping items which have already been formatted and defined. Similarly, by defining the properties associated with each of those elements, the user can set filters used in generating a query against a database in order to obtain the actual data defined by the overall report definition, and the subelements thereof.

Figure 9A:
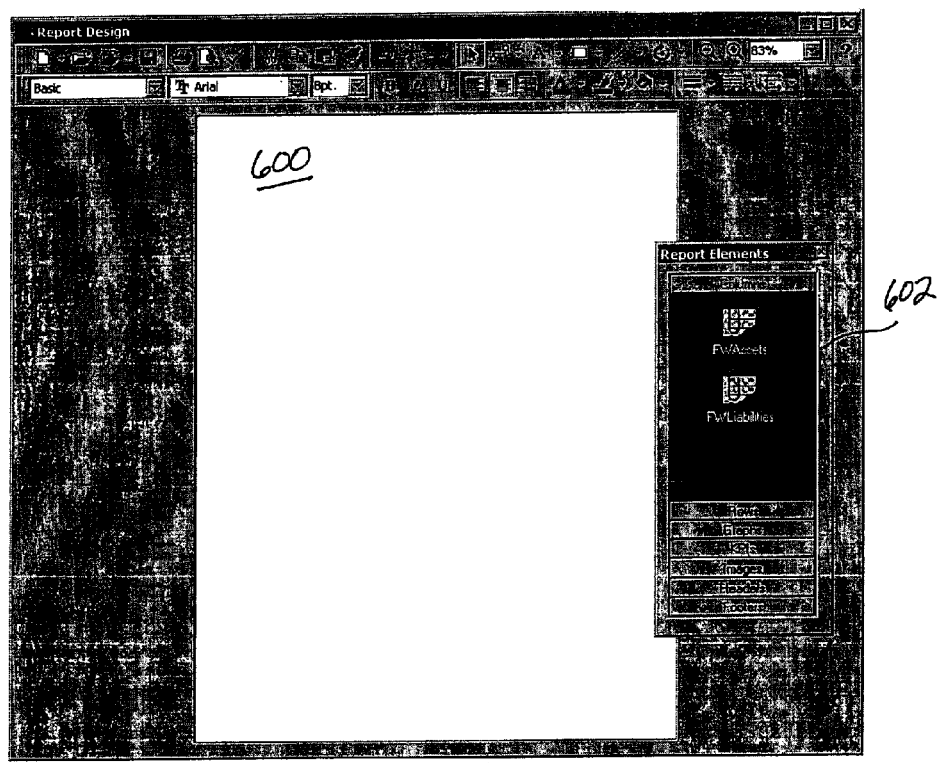
Figure 9B:
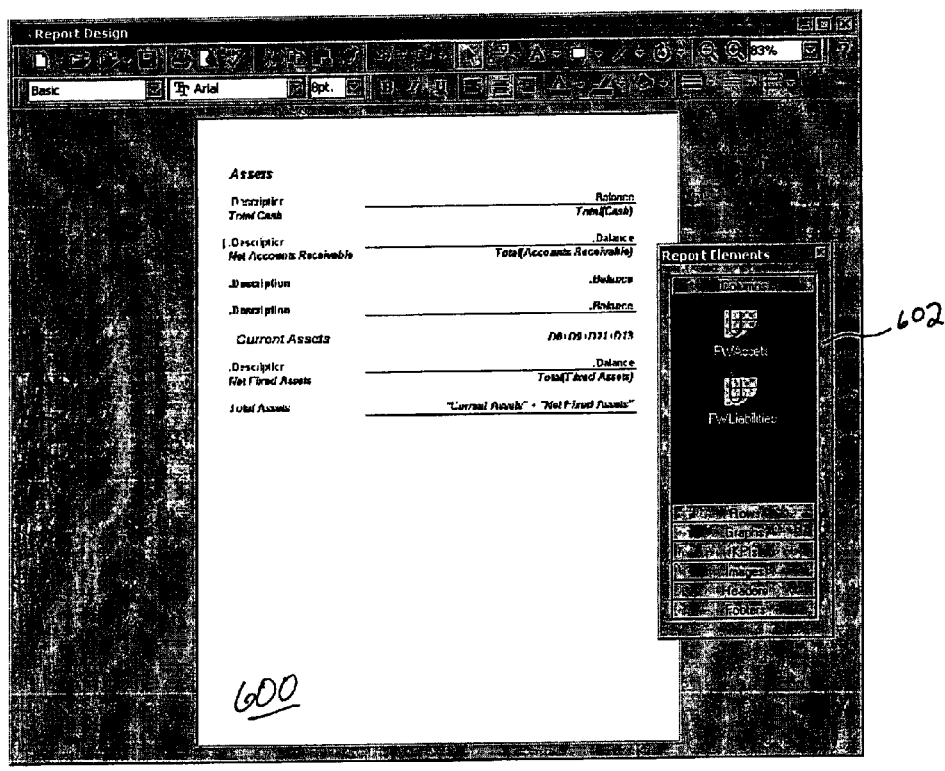

FIGS. 9A-9E illustrate another embodiment of a user interface used to define a report. FIG. 9A shows that the user has selected to define a report and has been provided with a canvas 600 upon which to define the report. FIG. 9A also shows that the user has already set up two report definition components identified in box 602. Those components include Assets and Liabilities.

Once they have been defined, building reports with them is no more involved than simply dragging the appropriate components onto the layout canvas 600, adjusting them until they are placed where the user wishes them, and then saving the report.

Figure 9C:
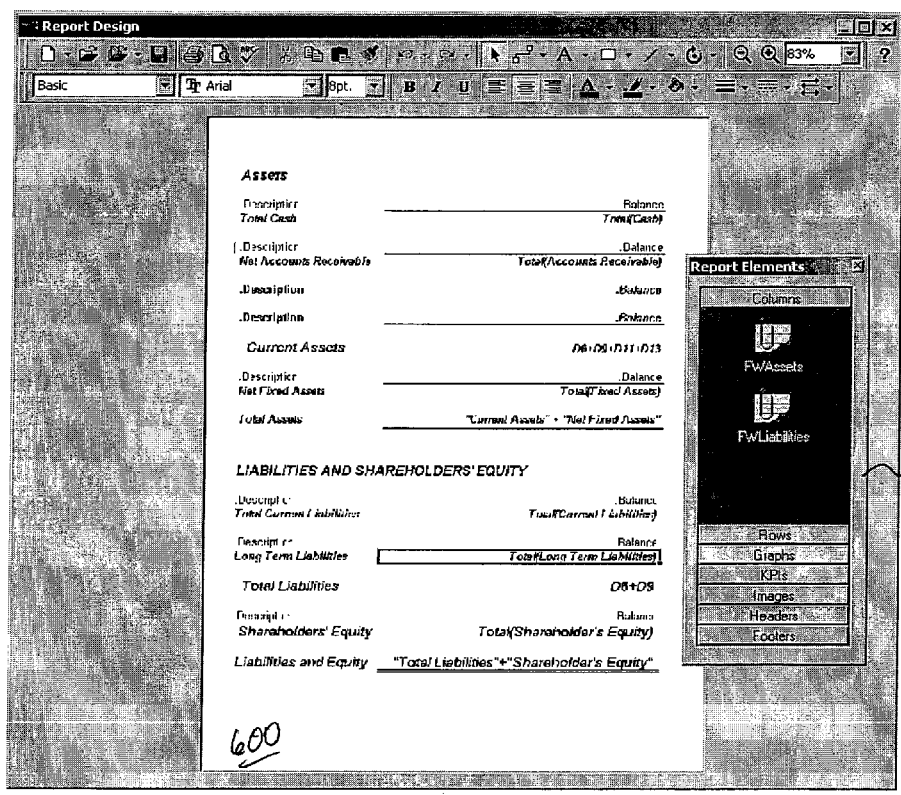
Figure 9D:
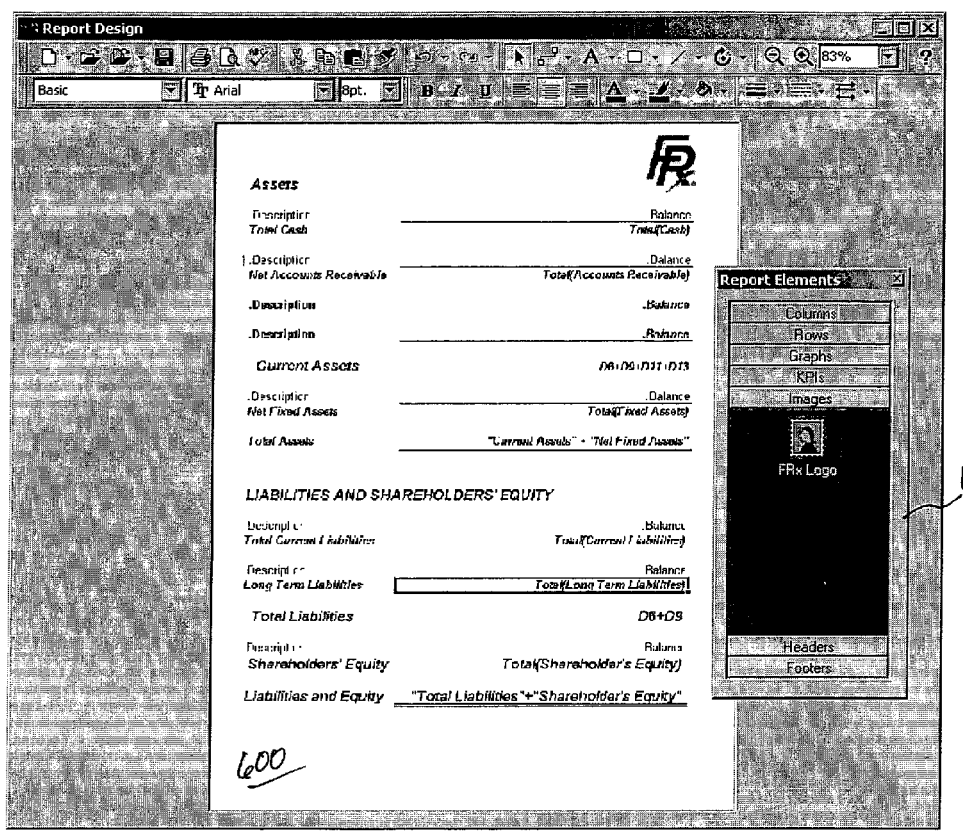

FIG. 6B shows that the user has dragged and dropped the Assets report definition component onto canvas 600 from box 602. FIG. 9C shows that the user has dragged and dropped the Liabilities report definition component onto canvas 600 from box 602. FIG. 9C shows that the user has dragged and dropped an image (the logo) onto canvas 600 from box 602. FIG. 9D shows that the user is provided with a visual indication of how the entire report will look before the report is ever run.

Of course, once the report is run, the actual data defined by the datasets, report definition components and data items will be retrieved from the database and placed in the appropriate fields. One embodiment of an illustrative report which was run using the definition template shown in FIG. 9D is illustrated in FIG. 9E. Of course, the header associated with the report in FIG. 9E has been changed from that shown in the template. This is simply a matter of changing it on the canvas shown in FIG. 9D and saving that as the report definition.

FIGS. 10A-10D illustrate how the report definition components which were set up and are displayed in box 602 can be re-used to construct an entirely different report, in this case, a side-by-side report. First, the user indicates through an appropriate input that the user wishes to define a report and that the user wishes the report to be displayed in landscape. The user is then provided with a landscape canvas 650 on which to define the report.

Figure 10A:
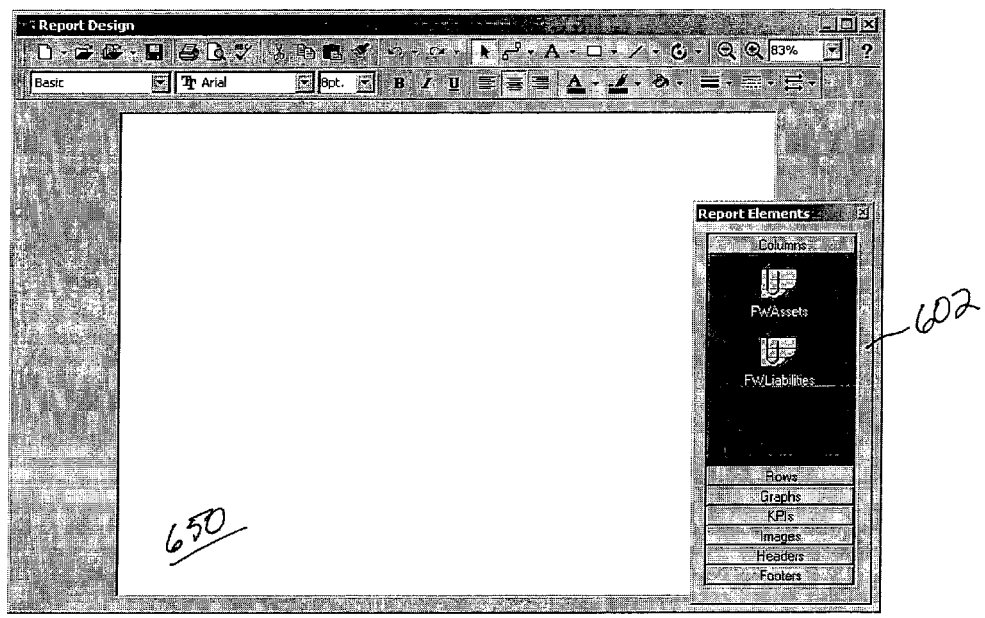
Figure 10B:
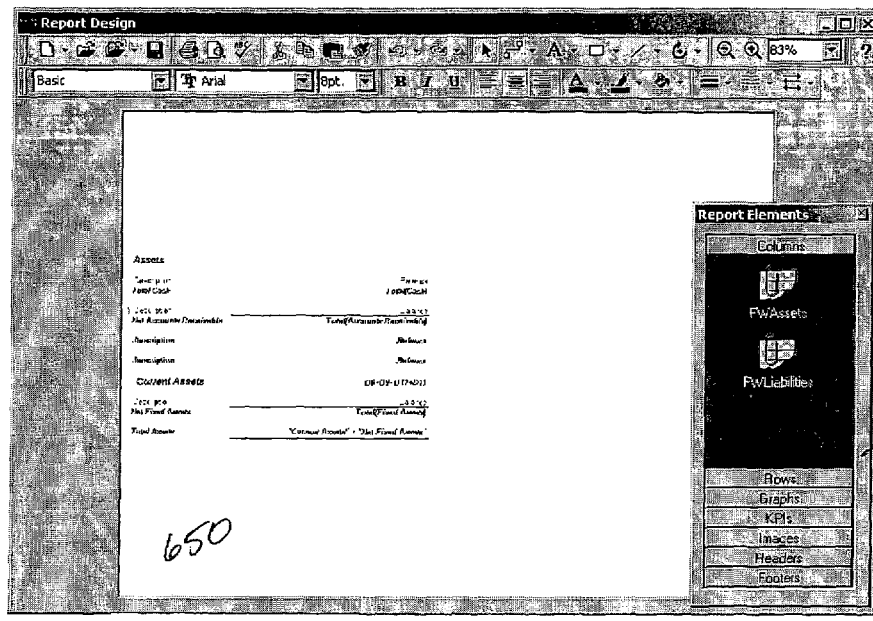
Figure 10B:
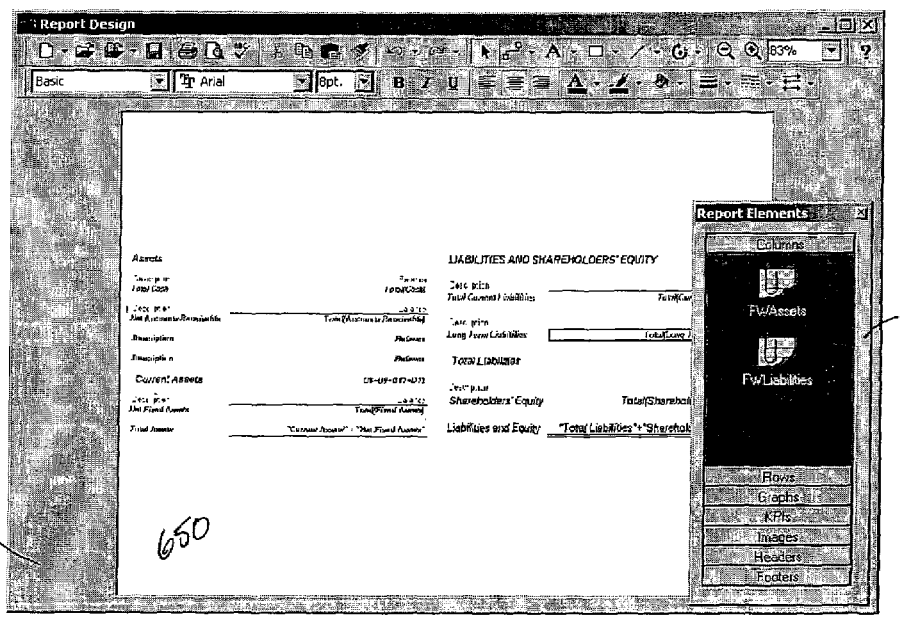
Figure 10C:
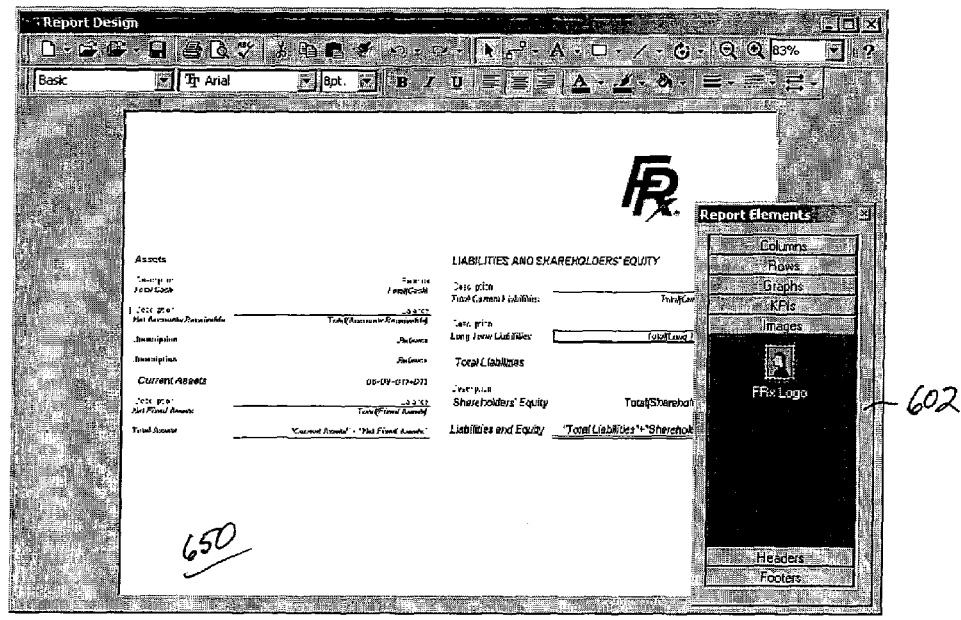

The upper part of FIG. 10B shows that the user has dragged and dropped the Assets report definition component from block 602 onto canvas 650. The lower part of FIG. 10B shows that the user has also dragged and dropped the Liabilities report definition component from block 602 onto canvas 650. FIG. 10C shows that the user has added a logo and FIG. 10D illustrates one embodiment of a report generated using the template shown in FIG. 10C.

It can thus be seen that once the user has defined report sections using the datasets. Those report sections can be reused or moved into different reports very easily and quickly. While the present discussion has proceeded with respect to financial reporting, the present system can be used for any type of database reporting. Each item in the grid structure of a reporting section has properties which define the filter or query elements for executing a query against a database to obtain the actual data for the report. Thus, the report sections contain a user-defined format and can be dragged and dropped or otherwise reused and easily moved about. Similarly, the user is provided with a visual indication of how the report will look, as it is being defined.

Although the present invention has been described with reference to particular embodiments, workers skilled in the art will recognize that changes may be made in form and detail without departing from the spirit and scope of the invention.

What is claimed is:

1. A method of defining a report of data items in a data store, comprising:
   receiving a dataset input indicative of a user-defined set of data items to be included in a dataset;
   receiving a plurality of report section format inputs indicative of user-defined formats of a plurality of report sections and user-selected datasets to be included in the report sections, the formats defining at least how the user-selected datasets appear relative to one another in the report sections by;
   generating a visual indication of an appearance of a report section based on the user-defined format of the report section upon receiving a report section format input corresponding to the report section;
   receiving a dragging input from a user input device, the dragging input being indicative of a user dragging a report section component icon representative of a report section component, from a first portion of a visual display to a desired location on a report section portion of the visual display;
   receiving a dropping input from the user input device indicative of the user dropping the dragged report section component icon at the desired location on the report section portion of the visual display
   defining a plurality of report sections with the user-defined formats and identifying the user-selected datasets, the report sections being individually selectable for inclusion in a report and, when selected, being placeable within a report relative to other selected report sections according to a user-defined placement and causing a report generator to retrieve the user-selected datasets and present the user-selected datasets of data items in the user-defined formats for selected report sections, and to present the selected report sections placed relative to one another based on the user-defined placement, when a report is generated that includes the selected report sections;
   receiving a report definition input indicative of a user-defined format of the report and identifying selected report sections to be included in the report and a location of the selected report sections in the report; and
   storing a selected plurality of report sections that include dataset identifiers identifying datasets to be included in the report sections, the selected report sections having a user-defined format and being re-usable in different reports.

2. The method of claim 1 and further comprising:
   generating a visual indication of an appearance of the report based on the user-defined format of the report, upon receiving the report definition input.

3. The method of claim 2 wherein receiving a report definition input comprises:
   displaying a report section icon to the user.

4. The method of claim 3 wherein receiving a report definition input further comprises:
   receiving a dragging input from a user input device, the dragging input being indicative of a user dragging a displayed report section icon from a first portion of a visual display to a desired location on a report portion of the visual display; and
   receiving a dropping input from the user input device, indicative of the user dropping the dragged report section icon at the desired location on the report portion of the visual display.

5. A computer-implemented method of defining reports used in reporting data items stored in a database, the method comprising:
   defining a plurality of user-defined datasets, the datasets being configured to be selected for use in a plurality of different report sections, each dataset including data identifiers indicative of data items in the database to be included in the dataset when a report that includes the dataset is generated;
   defining a plurality of report sections each having a user-defined section format and user-selected datasets, the section format determining where the user-selected datasets reside and how the user-selected datasets appear relative to one another in the report section when a report that includes the report section is generated by:
      displaying report section component icons, indicative of report section components including datasets;
      displaying a report section such that the user can select the datasets for use in the displayed report sections by dragging and dropping selected ones of the report section component icons onto the displayed report section;
      defining a report with a report definition, the report definition having a user-defined report format and user-selected report sections, the report format determining where the user-selected report sections reside in the report when the report is generated; and
      wherein the report sections with the user-selected datasets are configured to be individually selectable for use in a plurality of different reports and placable within each report relative to other selected report sections and user-selected datasets.

6. The method of claim 5 wherein defining a plurality of report sections comprises:
   displaying the displayed report section with the selected report section components thereon, the selected report section components being positioned relative to one another based on a position at which the report section component icons were dropped.

7. The method of claim 5 wherein defining a report comprises:
   displaying report section icons indicative of report sections; and displaying a report definition such that the user can select the report sections by dragging and dropping selected ones of the report section icons onto the displayed report definition.

8. The method of claim 7 wherein defining a report comprises:
displaying the displayed report definition with the selected report sections thereon the selected report sections being positioned relative to one another based on a position at which the report section icons were dropped.

9. A report definition system used to define a format and content of reports that report data items in a data store, the system comprising:
a report design component configured to receive a dataset input indicative of a user-defined set of data items to be included in a dataset, and a report section format input indicative of a user-defined format of a report section and user-selected datasets to be included in the report section when the report is generated and defining an appearance of user-selected datasets relative to one another in the report section, the report design component being configured to display dataset icons on a first portion of a display and receive the report section format input as an input indicative of a user dragging a selected dataset icon from the first portion of the display to a report section portion of the display and dropping the selected dataset icon at a desired location on the report section portion, the report design component being configured to define a report section based on the dataset input and the report section format input so that the report section is individually selectable for inclusion in a plurality of different reports and placeable within each report at a user-defined placement relative to other report sections, and causing a report generator to retrieve the user-selected datasets of data items and present the datasets in the user-defined format when a report that includes the report section is generated, wherein the report design component is configured to receive a report format input indicative of user-selected report sections to be included in the report, wherein the report format input is further indicative of a position of the user-selected report sections relative to one another in the report, the report design component being configured to display an indication of how the report section will look, based on the report section format input, and how the report will look prior to generating the report.

10. The system of claim 9 wherein the report design component is configured to display report section icons on a first portion of a display and receive the report format input as an input indicative of a user dragging a selected report section icon from the first portion of the display to a report portion of the display and dropping the selected dataset at a desired location on the report portion.

* * * * *